No. 625,323. Patented May 23, 1899.
J. & W. CRAGGS.
PLOW ATTACHMENT.
(Application filed Apr. 18, 1898.)
(No Model.) 2 Sheets—Sheet 1.

Witnesses
E. Johnson
George F. Rooke

Inventors
Jesse Craggs
Wesley Craggs
By L. M. Thurlow Atty.

No. 625,323. Patented May 23, 1899.
J. & W. CRAGGS.
PLOW ATTACHMENT.
(Application filed Apr. 18, 1898.)
(No Model.) 2 Sheets—Sheet 2.

Witnesses
Inventors
Jesse Craggs
Wesley Craggs

UNITED STATES PATENT OFFICE.

JESSE CRAGGS AND WESLEY CRAGGS, OF KILBOURNE, ILLINOIS.

PLOW ATTACHMENT.

SPECIFICATION forming part of Letters Patent No. 625,323, dated May 23, 1899.

Application filed April 18, 1898. Serial No. 677,951. (No model.)

*To all whom it may concern:*

Be it known that we, JESSE CRAGGS and WESLEY CRAGGS, citizens of the United States, residing at Kilbourne, in the county of Mason and State of Illinois, have invented certain new and useful Improvements in Plow Attachments; and we do hereby declare that the following is a full, clear, and exact description of the invention, which will enable others skilled in the art to which it appertains to make and use the same.

This invention relates to attachments for plows, being intended more particularly for riding-plows.

The object of our invention is to provide plows of the character described with a device or devices of one form or another for preventing the up and down movements of the plow while at work in the ground. It is well known that when plowing across old furrows the wheels rise and fall as the hills and hollows are encountered, causing the plow to have a vertical oscillatory movement, making a furrow of uneven depth. The effect on the machine is injurious and the operator is caused much annoyance. In view of this it is our purpose to provide a simple compensating device to permit the plow to move steadily over rough or broken ground. We are aware that it is not new to provide means for accomplishing this purpose; but the construction we show and describe we believe to be new, especially as we provide means for throwing the wheels to one side in order to make the act of turning around more easy.

That our ideas may be easily understood we have provided various figures on the drawings, in which—

Figure 1:
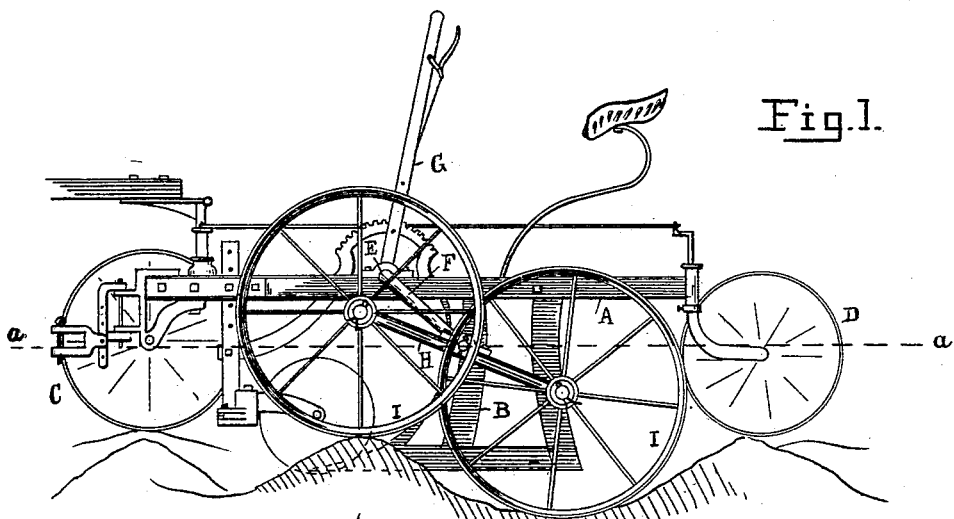
Figure 2:
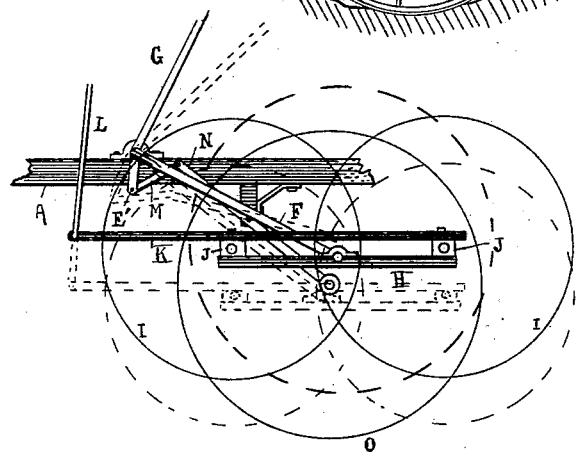
Figure 3:
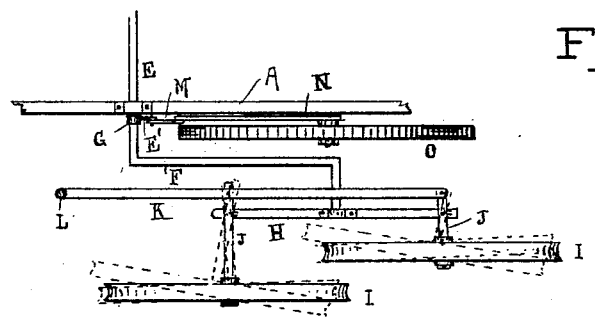
Figure 4:
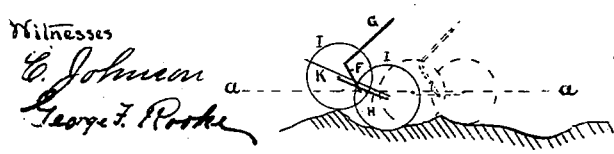
Figure 5:
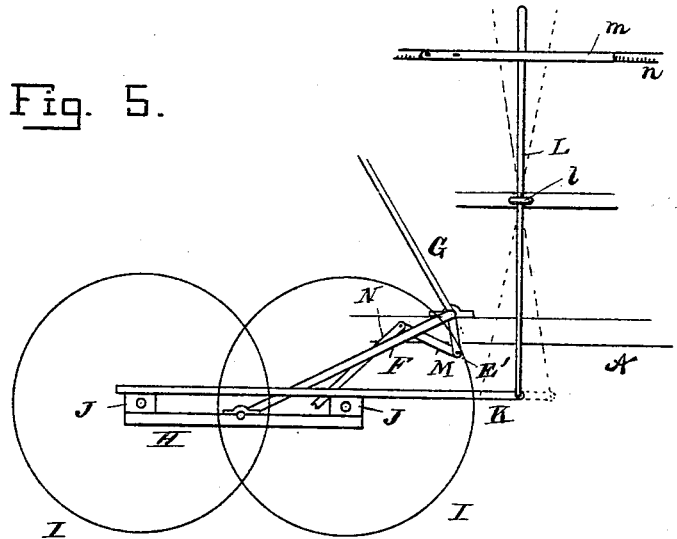
Figure 6:
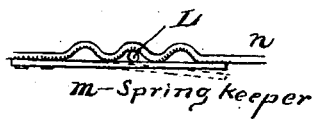

Figure 1 is a side elevation of the riding-plow, showing our attachment. Fig. 2 is a side view of part of a plow-frame, showing our attachment and a system of levers and an additional wheel, not shown in Fig. 1. Fig. 3 is a plan view of that shown in Fig. 2. Fig. 4 is a view of enough of our device to show its various positions when traversing uneven ground. Fig. 5 is a detail view of a lever mechanism for moving a pair of carrying-wheels. Fig. 6 is a plan view of a notched bar shown in Fig. 5.

We omit from Fig. 1 the mechanism shown in Figs. 2 and 3 in order that such figure will not be complicated. Obviously the portion is not necessary to the operation of the plow, but is described and claimed.

In Fig. 1, A is the plow-frame, and B the plowshare. C and D indicate the carrying-wheels at the farther side of the machine, which usually traverse the new level furrow. On the frame A is journaled a shaft E, having an arm F, controlled by a lever G, all of which is common to most machines of this class.

Our invention is embodied in an arm H, pivotally secured to the end of the arm F, carrying at each end a wheel I, together with certain attachments shown in Fig. 2. This figure shows the device without reference to the proportions shown in Fig. 1. F is the arm of shaft E, carrying the free arm H. At each end of said arm is pivoted an arm J, supporting a wheel I, (shown in unbroken lines.) The opposite ends of the arms J are pivotally secured to a rod K, controlled by a lever L. This lever is free to move vertically as the wheels move up and down, suitable means being used to permit such movement shown in Figs. 5 and 6, wherein L is the lever held in an eye $l$, secured to a portion of the framework. Above the eye is a suitably-supported bar $n$, having notches therein to receive the lever, the latter being free to move vertically within the notches. The middle notch holds the lever when the plow is traveling forward. The extreme notches hold it when the wheels are swung at an angle. A spring-keeper $m$ serves to retain the lever within the notches, but not shown. Fig. 3 shows the several positions. Thus it will be seen the lever L is free to move vertically at all times and can be moved by the operator forward or backward to swing the wheels at the angle required while such lever oscillates. The eye $l$ permits the lever to move easily, but at the same time forms a fulcrum therefor. The lever G is extended below the shaft E and E' and is connected pivotally by the link M with a lever N, pivoted on the plow-frame, the free extremity of said lever carrying a single wheel O. In the position shown in unbroken lines the wheel O carries the weight of the plow, and the position shown in broken lines indicates the wheel O in a raised position, with the wheels I carrying the weight. Since the arm N is pivoted near its middle to the depending end of the said lever G, it follows that the lower end of the arm carrying the wheel O will be depressed when such lever is carried forward. At the same time the arm F will have a reverse movement to raise the wheels I by reason of forming part of the shaft E. When the lever is thrown rearwardly, the opposite movement results—i. e., the wheel O rises and the wheels I are depressed or lowered. Obviously the wheel O does not require turning at an angle, as do the wheels I.

The use of the single wheel O is to make the act of turning around an easy matter, as has before been stated, this portion being used when the wheels I are not provided with means for turning them at an angle.

The dotted lines a a, Figs. 1 and 4, show the course described by the end of the arm F in moving over rough ground, such movement being identical with that of a single wheel running on level ground.

The advantages of our improvements will be thoroughly appreciated by those acquainted with the trouble experienced in plowing rough ground with a riding-plow. We do not limit ourselves to the particular construction shown and described, but bring out these forms merely to carry our ideas into effect.

Having thus fully described our invention, what we claim as new, and desire to secure by Letters Patent, is—

1. In a plow attachment the combination with the plow-frame, of an axle journaled thereon, such axle being provided with a crank portion, an arm pivoted at its middle to the end of the crank, a wheel pivotally attached to each end of the arm, a lever for operating the axle and crank and a secondary lever arranged to swing the said wheels on their pivots independent of the pivotal arm substantially as set forth.

2. In a plow attachment the combination with the plow-frame, of an axle journaled thereon and provided with a crank portion, an arm pivoted to the crank, a wheel pivoted near each extremity of such pivotal arm, a lever for moving the wheels on their pivotal supports, and a lever for operating the axle for adjusting the height of the wheels substantially in the manner and for the purposes herein set forth and described.

3. In a plow attachment the combination with the plow-frame, of an axle journaled thereon, such axle being provided with a crank portion, an arm pivoted at its middle to the end of the crank, a wheel pivotally attached to each end of the arm, a lever for operating the axle and crank and a secondary lever arranged to swing the said wheels on their pivots independent of the pivotal arm, an arm mounted on the plow-frame, a wheel journaled on the arm and adapted to be moved vertically and suitable connections between the arm and the operating-lever substantially as set forth and described.

In testimony whereof we affix our signatures in presence of two witnesses.

JESSE CRAGGS.
WESLEY CRAGGS.

Witnesses:
C. G. CLOVE,
H. A. FEILD.